US011366461B2

(12) United States Patent
Alsaleem

(10) Patent No.: US 11,366,461 B2
(45) Date of Patent: *Jun. 21, 2022

(54) REMOTELY TESTING WHETHER A CLIMATE CONTROL SYSTEM CONTROLLER IS CORRECTLY INSTALLED

(71) Applicant: EMERSON ELECTRIC CO., St. Louis, MO (US)

(72) Inventor: Fadi M. Alsaleem, Andover, KS (US)

(73) Assignee: Emerson Electric Co., St. Louis, MO (US)

( * ) Notice: Subject to any disclaimer, the term of this patent is extended or adjusted under 35 U.S.C. 154(b) by 549 days.

This patent is subject to a terminal disclaimer.

(21) Appl. No.: 16/556,480

(22) Filed: Aug. 30, 2019

(65) Prior Publication Data

US 2019/0391572 A1 Dec. 26, 2019

Related U.S. Application Data

(63) Continuation-in-part of application No. 15/236,211, filed on Aug. 12, 2016, now Pat. No. 10,401,830.

(Continued)

(51) Int. Cl.

| G05D 23/00 | (2006.01) |
|---|---|
| G05D 23/19 | (2006.01) |
| G05B 11/01 | (2006.01) |
| F24F 11/00 | (2018.01) |
| G05B 23/02 | (2006.01) |
| H04W 4/80 | (2018.01) |
| G06F 9/54 | (2006.01) |

(Continued)

(52) U.S. Cl.
CPC ......... *G05B 23/0221* (2013.01); *G05D 23/30* (2013.01); *G06F 9/542* (2013.01); *H04L 41/0813* (2013.01); *H04L 41/0869* (2013.01); *H04L 41/0886* (2013.01); *H04L 43/50* (2013.01); *H04W 4/80* (2018.02)

(58) Field of Classification Search
CPC ..... G05B 23/0221; H04W 4/80; G05D 23/30; G06F 9/542; H04L 41/0813; H04L 41/0869; H04L 41/0886; H04L 43/50
See application file for complete search history.

(56) References Cited

U.S. PATENT DOCUMENTS

| 6,851,621 B1 | 2/2005 | Wacker | |
|---|---|---|---|
| 8,374,725 B1 * | 2/2013 | Ols | G05D 27/02 261/118 |

(Continued)

*Primary Examiner* — Christopher B Robinson
(74) *Attorney, Agent, or Firm* — Harness, Dickey & Pierce, P.L.C.; Anthony Fussner

(57) ABSTRACT

Disclosed are exemplary embodiments of apparatus and methods for remote testing of controllers such as thermostats, to detect incorrect climate control system configuration parameters. In an exemplary embodiment, a mobile device wirelessly connects with a remote thermostat and sends signal(s) to the thermostat instructing the thermostat to perform climate control function(s) in predefined sequence (s). The mobile device receives signal(s) from the thermostat indicating whether the thermostat is performing the climate control function(s) in accordance with the sent signal(s). Based on the signal(s) received from the thermostat, the mobile device determines whether the thermostat is configured with accurate climate control system configuration parameters.

22 Claims, 8 Drawing Sheets

Related U.S. Application Data

(60) Provisional application No. 62/205,207, filed on Aug. 14, 2015.

(51) Int. Cl.
*G05D 23/30* (2006.01)
*H04L 41/08* (2022.01)
*H04L 41/0813* (2022.01)
*H04L 43/50* (2022.01)
*H04L 41/0869* (2022.01)

(56) References Cited

U.S. PATENT DOCUMENTS

| | | |
|---|---|---|
| 8,442,693 B2 | 5/2013 | Mirza |
| 8,757,507 B2 | 6/2014 | Fadell et al. |
| 9,459,018 B2 | 10/2016 | Fadell |
| 9,657,957 B2 | 5/2017 | Bergman |
| 9,683,753 B2 | 6/2017 | Lorenz |
| 10,401,830 B2 | 9/2019 | Alsaleem |
| 2005/0040247 A1 | 2/2005 | Pouchak |
| 2005/0040250 A1 | 2/2005 | Wruck |
| 2010/0262298 A1* | 10/2010 | Johnson ............ F24F 11/62 700/277 |
| 2011/0264275 A1 | 10/2011 | Thomle |
| 2013/0204440 A1 | 8/2013 | Fadell |
| 2013/0282186 A1 | 10/2013 | Douglas |
| 2013/0310988 A1* | 11/2013 | Sartain ............ F24F 11/00 700/276 |
| 2013/0325997 A1 | 12/2013 | Higgins |
| 2014/0012543 A1 | 1/2014 | Son |
| 2014/0096126 A1 | 4/2014 | Gourlay |
| 2014/0200718 A1 | 7/2014 | Tessier |
| 2014/0346239 A1 | 11/2014 | Fadell |
| 2015/0219357 A1 | 8/2015 | Stefanski |
| 2016/0047567 A1* | 2/2016 | Sørensen ............ F24F 11/70 165/209 |
| 2018/0038608 A1 | 2/2018 | Ino |

\* cited by examiner

| No. | Menu Item | Default | Options |
|---|---|---|---|
| 1 | Wireless Setup Connects Thermostat to Wi-Fi network | --- | Connect |
| 2 | Fahrenheit or Celsius | F | F<br>C |
| 3 | Outdoor Equipment Configuration for Cooling or Heat Pumps | AC2 | AC1 - Conventional Cooling 1 (Single Stage)<br>AC2 - Conventional Cooling 2 (Two Stage)<br>HP1 - Heat Pump 1 (Single Stage)<br>HP2 - Heat Pump 2 (Two Stage)<br>AC0 - No Cooling |
| 4 | Indoor Equipment Configuration for Gas or Electric Heat | EL2 | GA1 - Gas 1 (Single Stage)<br>GA2 - Gas 2 (Two Stage)<br>EL1 - Electric 1 (Single Stage)<br>EL2 - Electric 2 (Two Stage)<br>FAN - Fan (No Heat) |
| 5 | Reversing Valve Position Selects "O" or "B" Setting for heat pumps only | O | O<br>B |
| 6 | Wireless Radio Turns Wi-Fi Radio On/Off | ON | On<br>Off |

FIG. 2

| | Actual system | | | | |
|---|---|---|---|---|---|
| Impact | AC1 | AC2 | HP1 | HP2 | |
| Potential User Input AC1 | | Only run in low stage and hard to keep home cool when hot outside | Big energy impact as Aux heat will be used 100% of the time & not the HP | Big energy impact as Aux heat will be used 100% of the time & not the HP — 304 | |
| AC2 | Minimum impact | | Big energy impact as Aux heat will be used 100% of the time & not the HP | Big energy impact as Aux heat will be used 100% of the time & not the HP | |
| HP1 | Discomfort and big energy impact. Running AC & furnace back & forth. Equipment Risk. | Discomfort and big energy impact. Running AC & furnace back & forth. Equipment Risk. | | Only run in low stage and auxiliary will be on more than needed | |
| HP2 | Discomfort and big energy impact. Running AC & furnace back & forth. Equipment Risk. | Discomfort and big energy impact. Running AC & furnace back & forth. Equipment Risk. | Minimum impact | | 308 |

FIG. 3A

| | Actual system | | | | | |
|---|---|---|---|---|---|---|
| Impact | Gas 1 | Gas 2 | EL1 | EL2 | FAN |
| Potential User Input | Gas 1 | | Only run in low stage and hard to keep home warm when cold outside | Potential of tripping as G is not active | Potential of tripping as G is not active | NO Fan |
| | Gas 2 | Minimum impact | | Potential of tripping as G is not active | Potential of tripping as G is not active | NO Fan |
| | EL1 | May violate safety (furnace should not run with HP) | May violate safety (furnace should not run with HP) | | Only run in low stage and auxiliary will be on more than needed | Minimum impact |
| | EL2 | May violate safety (furnace should not run with HP) | May violate safety (furnace should not run with HP) | Minimum impact | | Minimum impact |
| | FAN | NO HEAT | NO HEAT | NO HEAT | NO HEAT | |

FIG. 4A

REMOTELY TESTING WHETHER A CLIMATE CONTROL SYSTEM CONTROLLER IS CORRECTLY INSTALLED

CROSS-REFERENCE TO RELATED APPLICATIONS

This application is a continuation-in-part of U.S. patent application Ser. No. 15/236,211 filed Aug. 12, 2016 (published as US2017/0045251 on Feb. 16, 2017 and issuing as U.S. Pat. No. 10,401,830 on Sep. 3, 2019). U.S. patent application Ser. No. 15/236,211 claims the benefit of U.S. Provisional Application No. 62/205,207, filed Aug. 14, 2015. The entire disclosure of the above applications are incorporated herein by reference.

FIELD

The present disclosure generally relates to climate control systems and controllers, and more particularly (but not exclusively) to apparatus and methods for testing whether a climate control system controller is correctly installed.

BACKGROUND

This section provides background information related to the present disclosure which is not necessarily prior art.

When installing a new or replacement thermostat for use in a climate control system, a user or other installer connects wiring of the thermostat with wiring of the climate control system. As part of the installation process, the installer typically configures the thermostat with information describing the type(s) of equipment included in the climate control system.

DRAWINGS

The drawings described herein are for illustrative purposes only of selected embodiments and not all possible implementations, and are not intended to limit the scope of the present disclosure.

FIG. 2 illustrates a system configuration parameter menu in accordance with an example embodiment;

FIG. 3A illustrates possible consequences of incorrectly specifying an outdoor configuration for a climate control system;

FIG. 4A illustrates possible consequences of incorrectly specifying an indoor configuration for a climate control system;

DETAILED DESCRIPTION

Figure 1:
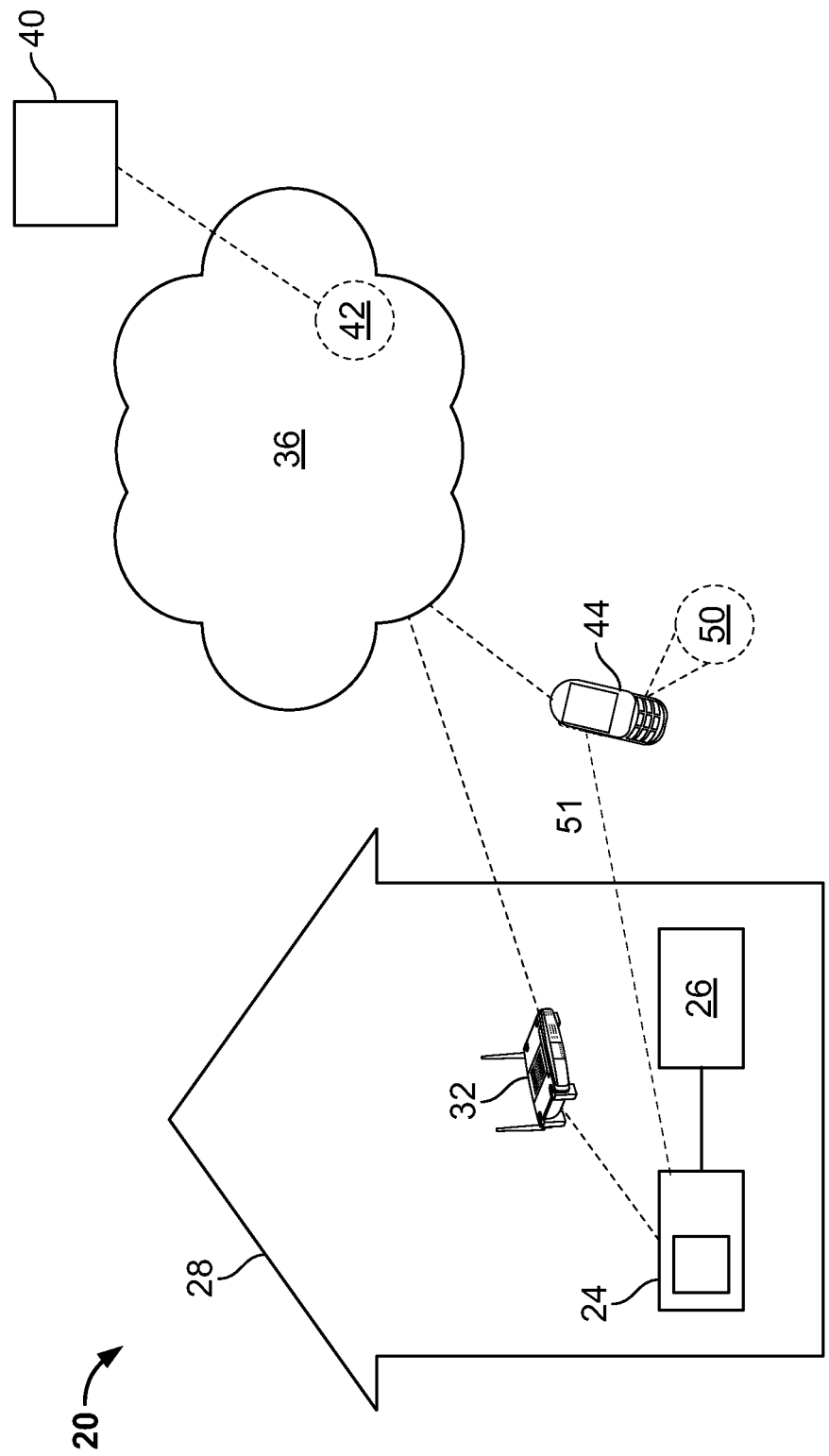
FIG. 1 is a diagram of an example embodiment of an apparatus configured to test whether a wireless-enabled climate control system thermostat has been correctly installed, the apparatus configured in accordance with one or more aspects of the disclosure.

Example embodiments will now be described more fully with reference to the accompanying drawings.

The inventor hereof has recognized that successful thermostat installation requires safe and correct wiring, and that a thermostat needs to be configured properly to operate with HVAC equipment. The inventor also has recognized that replacing an existing thermostat can be challenging, even for experienced HVAC installers, because of the wide variety of thermostat models coupled with a lack of an effective standard for thermostat terminal identification. Consumers, and even installers with advanced HVAC training and years of experience, frequently make costly mistakes when they have trouble finding, deciphering, and implementing the operations or actions needed for correct installation.

Some wireless-capable thermostats can be installed by a homeowner, contractor or other installer, e.g., who has downloaded a software application to a smart phone, tablet, or other communication device. The software application can be executed to "walk" the installer through steps for installing the thermostat and for provisioning the thermostat, e.g., to the homeowner's home wireless network. The software application, e.g., may provide a series of display screens on the installer's smart phone or other communication device that display instructions for installing the thermostat. As part of the installation process, the installer, who, e.g., has observed wiring and terminal designations on a thermostat that is being replaced, may provide information, e.g., to the software application, to describe the climate control system type. The thermostat may be configured for operation based on the installer's system type information. System type information entered by installers, however, is not always accurate. Even where a thermostat has been wired correctly, installers can make mistakes when entering the type of climate control system to be controlled by the thermostat. Moreover, many installers are unable to identify, understand, and implement the proper thermostat configuration. Specifying the wrong type of climate control system for the thermostat can lead to high utility bills, service callbacks, risks for climate control system equipment, and lost productivity for installers.

Accordingly, the inventor has developed and discloses herein exemplary embodiments of apparatus and methods for testing whether a wireless-enabled climate control system thermostat has been correctly installed. Such a thermostat may or may not have been installed with the assistance of a software application as previously described. Further, although various embodiments of the disclosure are described in relation to thermostats, the disclosure is not so limited. Other or additional types of wireless-enabled climate control system controllers could be installed, configured and/or reconfigured in accordance with various embodiments of the disclosure.

In various example embodiments, an apparatus is configured to remotely test whether a thermostat has been correctly installed. In some example embodiments, if a thermostat has not been correctly configured with the system type of the climate control system with which the thermostat is connected, the apparatus may automatically configure the thermostat correctly with system configuration parameters for that climate control system and/or notify a user of the thermostat and/or other recipient as to the configuration status.

In various embodiments, a remote testing apparatus includes at least one computer (e.g., a mobile device) connectible with a climate control system controller, e.g., a thermostat, installed in a climate control system for a structure. In one example embodiment, a mobile device is configured to send one or more instructions to an installed controller, instructing the controller to perform, e.g., in one or more predefined sequences, one or more predefined climate control functions. The mobile device receives, e.g., from the controller, one or more signals indicating whether the controller is performing the climate control function(s) in accordance with the instruction(s). In some embodiments, the received signal(s) indicate whether, and if so, how, climate in the structure is changed after instruction(s) are sent to the installed controller. Based on the received signal(s), the mobile device determines whether the controller is configured with accurate system configuration parameters for the climate control system.

In various example methods, test signals are applied to a new thermostat after the thermostat has been installed in a climate control system. The test signals are applied, e.g., over the Internet by a server remote from the thermostat, in logical order so as to detect and/or confirm the correctness of system configuration parameters configured on the thermostat. In some embodiments, the mobile device sends command signals to the thermostat and monitors direction(s) of change (if any) in temperature of the conditioned air as the climate control system operates. In some embodiments, the mobile device determines whether or not the temperature of the air changes as expected for the system configuration that was previously described by a user or other installer of the thermostat. In some example embodiments, after initiating climate control system configuration testing over the Internet, the mobile device determines a system configuration based on testing signals and air temperature changes, and compares the determined system configuration with a system configuration obtained from the thermostat as installed and configured by a user or other installer of the thermostat. The mobile device may alter the system configuration parameters of the thermostat, based on the comparison.

With reference now to the figures, FIG. 1 illustrates an exemplary embodiment of an apparatus 20 for testing whether a wireless-enabled climate control system thermostat has been correctly installed, the apparatus 20 embodying one or more aspects of the present disclosure. A thermostat 24 has been installed in a structure 28, e.g., a residence, to control a climate control system 26. Specifically, the thermostat 24 is connected to wiring of the climate control system 26 and also is configured with system configuration parameters describing a climate control system type. If the thermostat 24 has been installed correctly, the system configuration parameters accurately describe the type of equipment in the climate control system 26. The thermostat 24 is provisioned to communicate wirelessly in a user's wireless network 30 via a network access point, e.g., a home network router 32 that provides wireless access to a wide-area network 36 such as the Internet and/or cellular network(s).

The apparatus 20 includes one or more computers 40, e.g., one or more servers, routers, personal computers, combinations of the foregoing, various combinations of processors and memory, etc. In some embodiments, one or more of the computer(s) 40 are cloud-based. It should be noted that many different device configurations could be used to provide the capabilities described herein. In one example implementation, the computer(s) 40 are configured to provide energy information and energy management services through a web portal 42 that is available via the wide-area network 36. The web portal 42 may make such information and services available, e.g., to thermostat owners, installers, and other users. Thus, in various embodiments, the thermostat 24 may be remotely controlled by the homeowner and/or associated with a user account, e.g., for provision of energy management services by an energy management services provider.

In some example embodiments, the user may access the thermostat 24, e.g., from a user communication device 44, which may be, e.g., a mobile device such as a smartphone, an Internet-accessible laptop computer, a tablet, or other device.

For example, the user communication device 44 may be wirelessly connected with the thermostat 24. As shown in the example apparatus 20 of FIG. 1, the user communication device 44 is directly connected with the thermostat 24 via a short-range wireless connection 51.

The short-range wireless connection 51 may include any suitable short-range wireless protocol such as BLUETOOTH, Wi-Fi, etc. The short-range wireless connection 51 may allow the user communication device 44 to implement one or more of the capabilities described herein (e.g., the user communication device 44 may be considered a "remote tester"). Although FIG. 1 illustrates a short-range wireless connection 51, in other embodiments the user communication device 44 may be connected with the thermostat 24 via a different suitable wireless connection (e.g., long-range wireless, cellular, etc.), a wired connection, etc. In some embodiments, only the user communication device 44 may be used for automatic system configuration (e.g., the thermostat 24 may not receive any system configuration from a device other than the user communication device 44, such as a remote server, etc.).

Embodiments also are possible, however, in which a wire-enabled thermostat, regardless of whether or not a user may wirelessly access the thermostat, nevertheless may communicate wirelessly, e.g., with a remote server of the computer(s) 40 for the purpose of determining whether the thermostat has been correctly configured for a particular climate control system.

In the present example embodiment, the thermostat 24 is user-installed with the assistance of a software application 50. In some embodiments the user communication device 44 may receive user input and send the input, e.g., to a remote server that has or has access to the application 50. The server may be included, e.g., in computer(s) 40 and may cause at least a portion of the application 50 to be executed to produce output, which may be sent, e.g., by the server to the user communication device 44. Additionally or alternatively, a user may access the application 50 via a browser of the user communication device 44. The remote server may execute the application 50 and/or use input from the installer of the thermostat 24 to determine, e.g., a climate control system type for the user's new thermostat 24. The server may execute the application 50 to connect the thermostat 24 with the user network 26, and the server may push, or the thermostat 24 may pull, the system type configuration to the thermostat 24.

Alternatively, or in addition, the user communication device 44 may execute the application 50 to directly connect the thermostat 24 with the user communication device 44, and the user communication device 44 may push, or the thermostat 24 may pull, the system type configuration to the thermostat 24.

The user communication device 44 may be connected with the cloud 36 to transmit information requests, to receive periodic updates regarding software, etc., while also being connected with the thermostat 24 via the short-range wireless connection 51.

In various embodiments, a user who is installing a thermostat may be presented with a menu of system configuration parameter options. As shown in FIG. 2, an example configuration menu 200 provides a plurality of menu items 204 for which options 208 are selectable by an installer to configure a thermostat. Item "1" provides a "Connect" option selectable by an installer to connect a thermostat with a user home network. Item "2" options allow an installer to select whether temperature is displayed on a thermostat in Fahrenheit degrees or as Centigrade. Item "6" provides options for turning a thermostat wireless capability on or off.

Items "3", "4" and "5" provide options 208 whereby an installer may indicate system type information for configuring a thermostat in relation to a climate control system. Item "3" options 208 are for specifying an outdoor equipment configuration (e.g., for cooling or heat pump). Item "4" options 208 are for specifying an indoor equipment configuration (e.g., for gas or electric heat, which may or may not be an auxiliary heater for a system that includes a heat pump). Item "5" provides heat pump reversing valve position options 208. In various embodiments, default options 212 also may be provided for items "3", "4", and "5." In the present example embodiment, if an installer does not select any of the options for items "3", "4", and "5", a thermostat is configured to control an outdoor conventional two-stage cooling system (default option "AC2") and an indoor two-stage electric heating system (default option "EL2").

Several example climate control system types and corresponding wire connections to an installed thermostat are shown in Table 1. It can be seen from Table 1 that if a user incorrectly specifies a system type, an activated thermostat could use the wrong wire connections in communicating with a climate control system.

TABLE 1

| Wire Connections | Heat Pump wires | System Types | Indoor Stages Heat | Outdoor Stages Cool or Heat Pump |
|---|---|---|---|---|
| W | | Conventional - Gas or Electric Heat | 1 | 0 |
| W, Y, G | | Conventional - Gas or Electric Heat | 1 | 1 |
| W, W2, Y, G | | Conventional - Gas or Electric Heat | 2 | 1 |
| W, W2, Y, Y2, G | | Conventional - Gas or Electric Heat | 2 | 2 |
| W, W2 | | Conventional - Gas or Electric Heat | 2 | 0 |
| Y, G | | Cooling Only | 0 | 1 |
| Y, Y2, G | | Cooling Only | 0 | 2 |
| Y, G | O, B | Heat Pump | 0 aux. | 1 |
| W, Y, G | O, B | Heat Pump | 1 aux. | 1 |
| W, Y, Y2, G | O, B | Heat Pump | 1 aux. | 2 |
| G | | Fan Only | 0 | 0 |

Figure 3B:
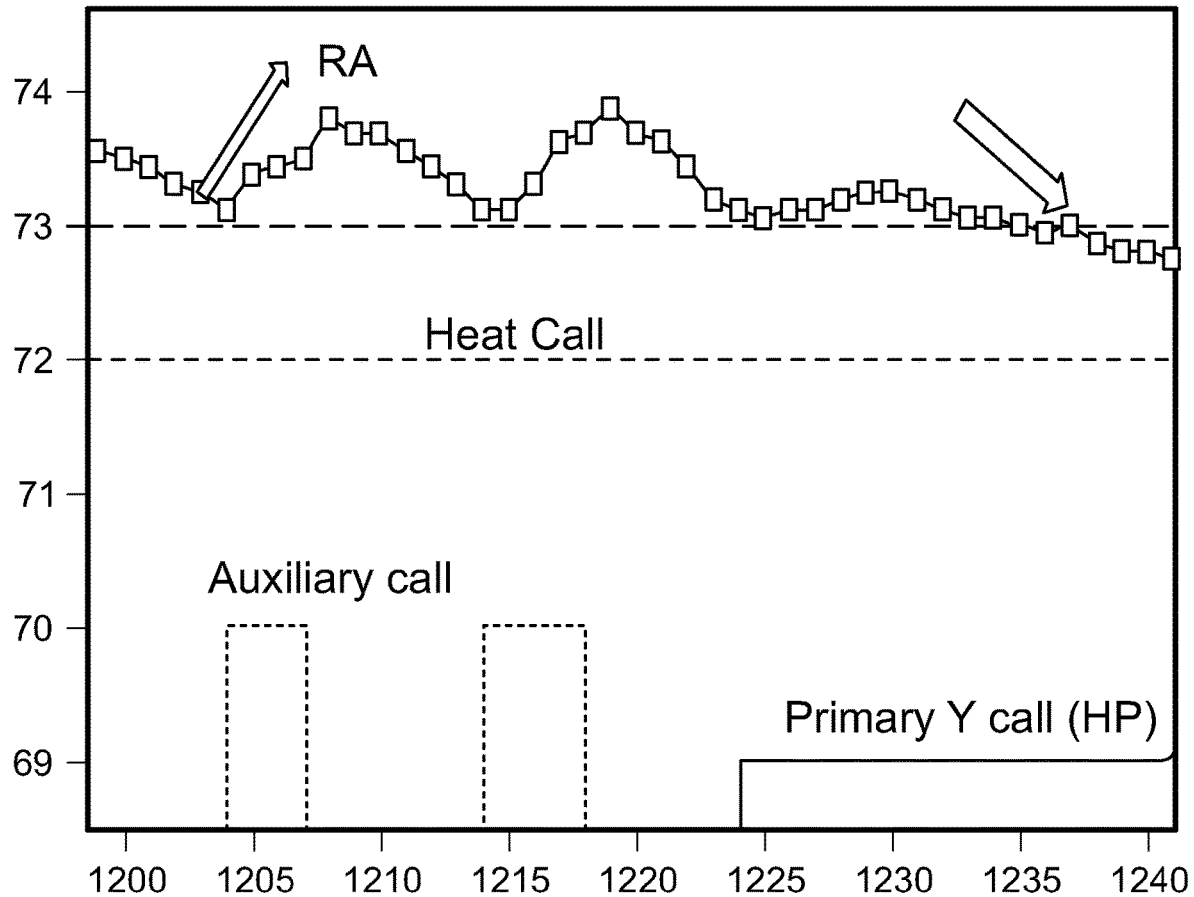
FIG. 3B is a graph showing performance by a climate control system controlled by a thermostat for which a heat pump was specified instead of an air conditioning unit.
Figure 4B:
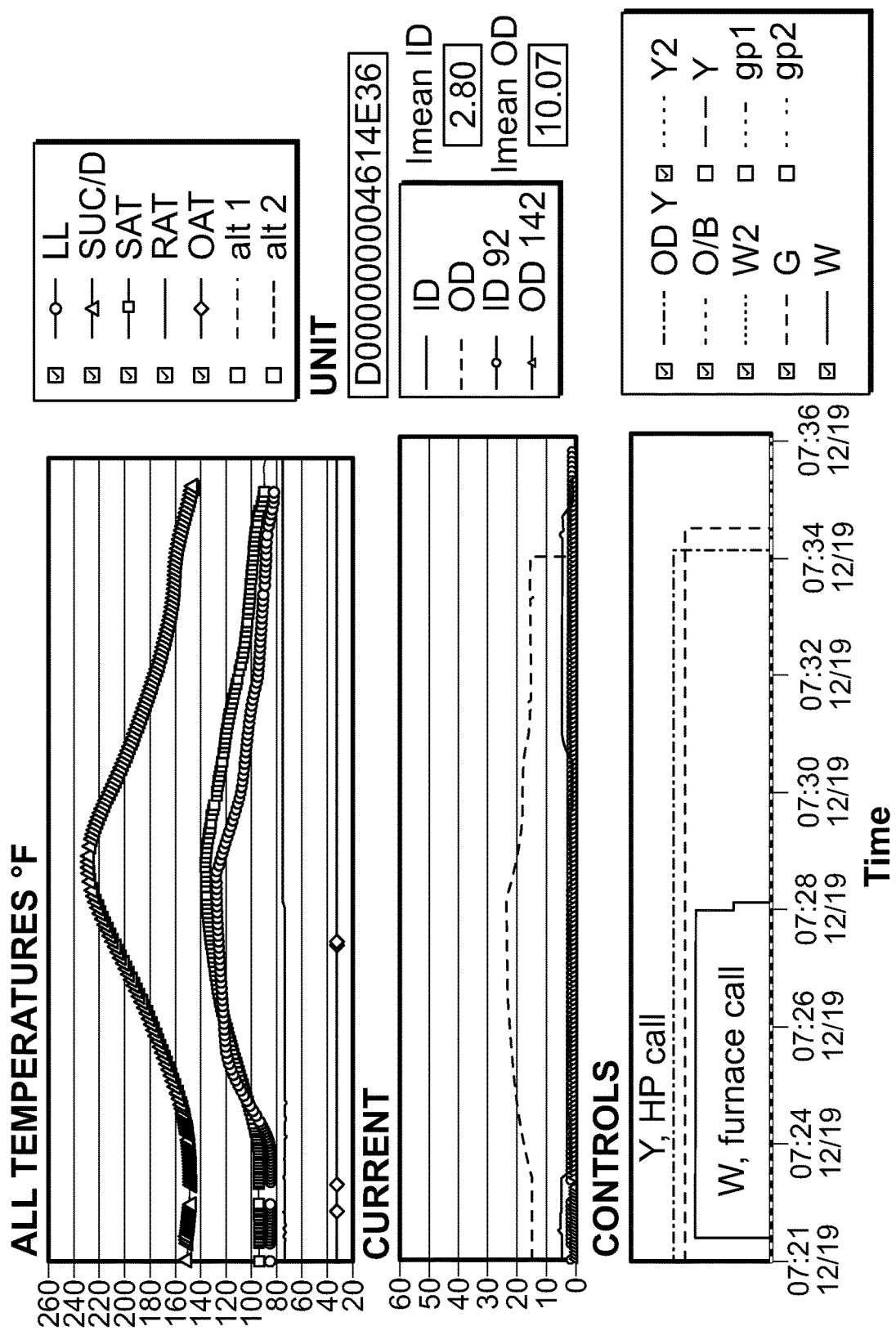
FIG. 4B is a graph showing performance by a climate control system controlled by a thermostat for which a heat pump and single-stage electric heat were specified instead of a heat pump and single-stage gas furnace.

Referring to FIG. 2, a thermostat would be incorrectly configured for a climate control system if an installer has selected one or more options 208 incorrectly for items "3", "4" and/or "5". Such a thermostat would not operate properly in relation to the climate control system. For example, FIG. 3A shows possible consequences of incorrectly specifying an outdoor configuration. Cases 304, for example, indicate possible results when an air conditioning unit is specified instead of an actual heat pump. Cases 308, e.g., indicate possible results when a heat pump is specified instead of an actual air conditioning unit. FIG. 3B is a graph showing one result of specifying a heat pump instead of an actual air conditioning unit. As shown in FIG. 3B, when outdoor ambient temperature was 15 degrees F., the air conditioning unit was called to operate in cooling mode alternately with the user's furnace. As another example, FIG. 4A shows possible consequences of incorrectly specifying an indoor configuration. Cases 404, for example, indicate possible results when electric auxiliary heat is specified instead of actual gas heating. FIG. 4B is a graph showing one result of incorrectly specifying a heat pump and electric heat instead of a heat pump and an actual gas furnace. As shown in FIG. 4B, the furnace ran at the same time as the heat pump.

In various embodiments, one or more remote servers, mobile devices, etc., of a testing apparatus may perform various methods to test whether a climate control system configuration was correctly specified. Referring to the example apparatus 20 of FIG. 1, one or more remote computers 40, the user communication device 44, etc., may be configured to test the climate control system type for the installed thermostat 24, e.g., via the application 50 after thermostat installation has been completed. In some other embodiments, remote computer(s), mobile device(s), etc., may perform a testing method to determine a climate control system type independently of a process for installing a thermostat.

Figure 5:
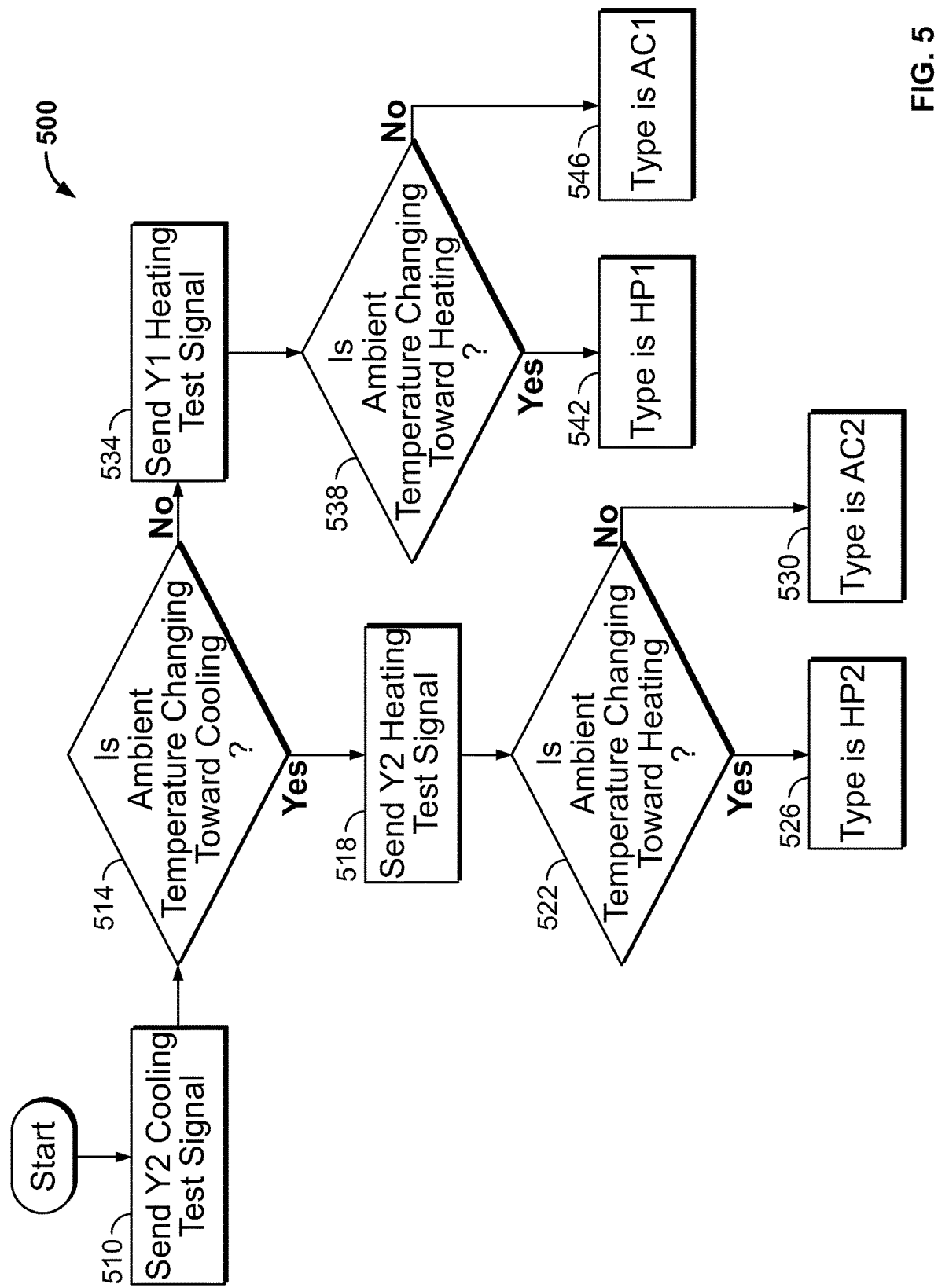
FIG. 5 is a flow diagram of a method of remotely testing a climate control system outdoor configuration in accordance with an example embodiment.
Figure 6:
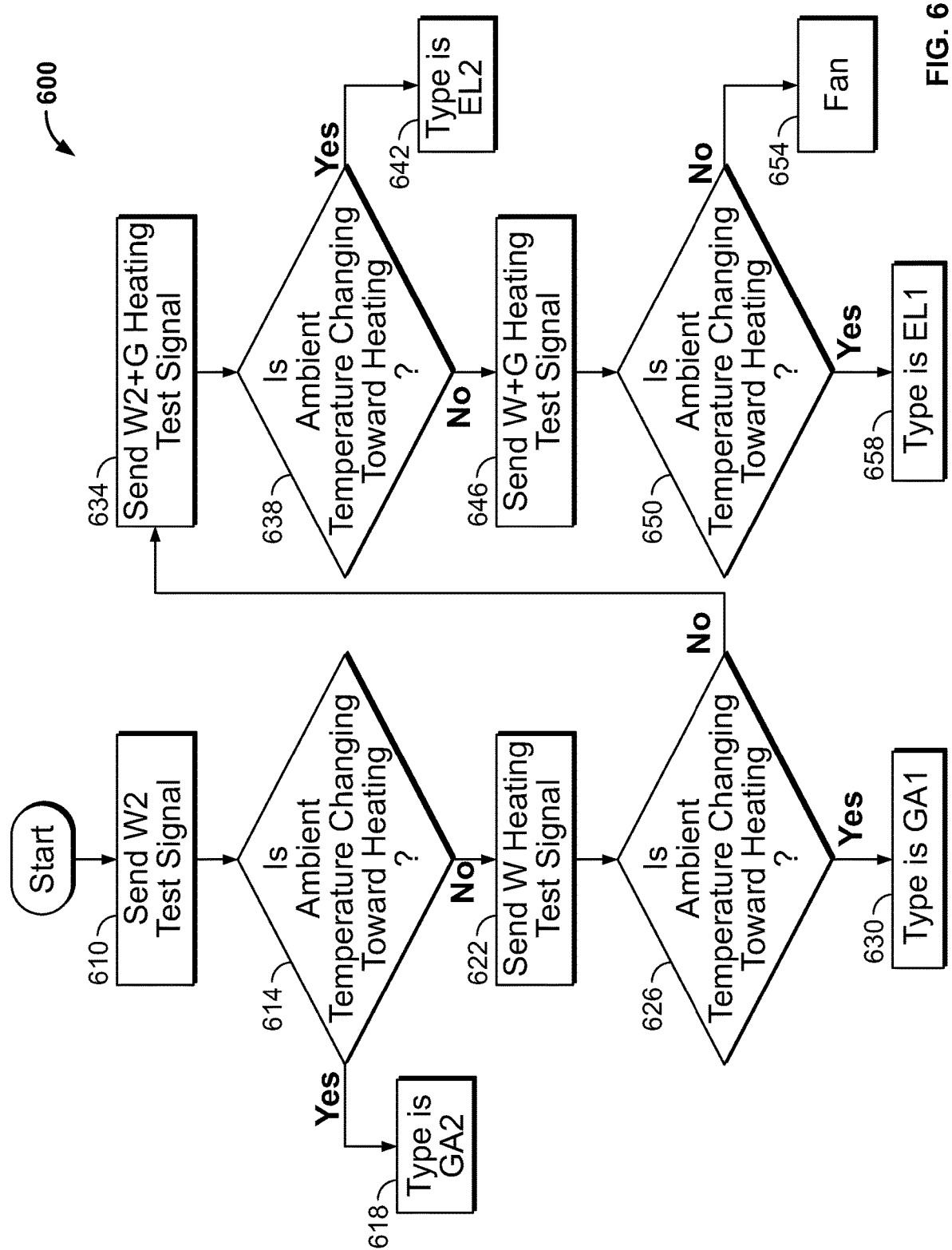
FIG. 6 is a flow diagram of a method of remotely testing a climate control system indoor configuration in accordance with an example embodiment.

Example remote testing methods are shown in FIGS. 5 and 6. One example method of remotely testing an outdoor configuration is indicated generally by reference number 500 in FIG. 5. The method 500 may be performed, e.g., when installation of a thermostat is completed and the thermostat is wirelessly connected with the remote testing apparatus. In the present example embodiment, the thermostat may periodically receive temperature sensor signals indicating current ambient temperature, e.g., in a house or other structure in which the thermostat is installed and/or in which the thermostat is to provide climate control. At various times, e.g., periodically, upon request, by push or pull from the thermostat, etc., the remote testing apparatus receives temperature values from the thermostat indicating the current ambient temperature in the structure.

In process 510, the apparatus sends a Y2 second-stage cooling test signal to the installed thermostat. In process 514 the apparatus compares temperature values received serially from the thermostat and determines whether the ambient temperature is changing toward cooling, e.g., decreasing. If so, then in process 518 the apparatus sends a Y2 second-stage heating test signal to the thermostat.

In the example method 500, it is assumed that a Y2 heating signal that follows a Y2 cooling signal would cause a reversing valve of a heat pump system, if present, to reverse from a cooling setting to a heating setting. In process 522 the apparatus compares temperature values received serially from the thermostat and determines whether the ambient temperature is changing toward heating, e.g., increasing. If so, then in process 526 the apparatus determines that the climate control system type includes a two-stage heat pump. Alternatively, if the apparatus determines in process 522 that the ambient temperature is not changing toward heating, then in process 530 the apparatus determines that the climate control system type includes a two-stage cooling unit.

If in process 514 it is determined that the ambient temperature is not changing toward cooling, then it is assumed that the system type includes a single-stage outdoor system. In process 534 the apparatus sends a Y1 first-stage heating test signal to the thermostat. In process 538 the apparatus compares temperature values received serially from the thermostat and determines whether the ambient temperature is changing toward heating, e.g., increasing. If so, then in process 542 the apparatus determines that the climate control system type includes a single-stage heat pump. Alternatively, if it is determined that the ambient temperature is not changing toward heating, then in process 546 the apparatus determines that the climate control system type includes a single-stage cooling unit.

One example method of remotely testing an indoor configuration is indicated generally by reference number 600 in FIG. 6. The method 600 may be performed, e.g., when installation of a thermostat is completed and the thermostat is wirelessly connected with the remote testing apparatus. In the present example embodiment, the thermostat may periodically receive temperature sensor signals indicating current ambient temperature, e.g., in a house or other structure in which the thermostat is installed and/or in which the thermostat is to provide climate control. At various times, e.g., periodically, upon request, by push or pull from the thermostat, etc., the remote testing apparatus receives temperature values from the thermostat indicating the current ambient temperature in the structure.

In process 610, the apparatus sends a W2 second-stage heating test signal to the installed thermostat. In process 614 the apparatus compares temperature values received serially from the thermostat and determines whether the ambient temperature is changing toward heating, e.g., increasing. If yes, then in process 618 the apparatus determines that the climate control system includes a two-stage gas heater. Otherwise, in process 622 the apparatus sends a W first-stage heating test signal to the thermostat.

In process 626 the apparatus compares temperature values received serially from the thermostat and determines whether the ambient temperature is changing toward heating, e.g., increasing. If so, then in process 630 the apparatus determines that the climate control system type includes a single-stage gas heater. Alternatively, if it is determined that the ambient temperature is not changing toward heating, then in process 634 the apparatus sends a W2+G heating test signal to the thermostat.

In the example method 600, it is assumed that a gas furnace would not require a thermostat to turn on a fan, because the gas furnace controller would do so. It also is assumed that an electric heater requires a thermostat to turn on a fan, and so the electric heater would be operated through a W+G or W2+G connection. In process 638 the apparatus compares temperature values received serially from the thermostat and determines whether the ambient temperature is changing toward heating, e.g., increasing. If so, then in process 642 it is determined that the system type includes a two-stage electric heater. If it is determined that the ambient temperature is not changing toward heating, then in process 646 the apparatus sends a W+G heating test signal to the thermostat. In process 650 the apparatus compares temperature values received serially from the thermostat and determines whether the ambient temperature is changing toward heating, e.g., increasing. If no, then in process 654 it is determined that the indoor system type is a fan. If the ambient temperature is changing toward heating, then in process 658 it is determined that the system type includes a single-stage electric heater.

In various embodiments, e.g., after a system type of a climate control system has been determined, a remote testing apparatus may perform one or more actions, including, e.g., sending revised system configuration parameters to the climate control system controller, automatically configuring the climate control system controller with revised system configuration parameters, emailing and/or otherwise notifying a user to change the system configuration parameters configured on the climate control system controller, emailing and/or otherwise notifying a user that the remote testing apparatus automatically configured the climate control system controller with revised system configuration parameters, etc.

It should be noted that the timing of receipt by a remote testing apparatus of temperature values from a thermostat can vary among remote testing method implementations, as can the timing of determinations made based on such temperature values. Further, the example methods 500 and 600 are examples only, and other or additional system types may be determined in accordance with various remote testing method implementations. In various implementations, a testing method could include other or additional assumptions, conditions, indicators, etc. For example, other or additional climate conditions pertinent to a structure, e.g., humidity, outdoor temperature, rates of change, etc., may be used in some embodiments in determining whether system configuration parameters are accurate for a given climate control system. Additionally or alternatively, in some implementations a user may input information to a remote testing apparatus, e.g., via a smart phone, computing device, thermostat user interface, etc., and the remote testing apparatus may incorporate the user information as input to a testing method. In some embodiments, a testing method may be configured to ignore an inaccurate specification of system configuration parameter(s), where the inaccurate specification would have minimal or no impact on operation of a climate control system.

Embodiments of the foregoing apparatus and methods can make it possible for an installer of a thermostat or other climate control system controller to ensure that system configuration parameters provided on the thermostat or other controller are accurate. Embodiments also make it possible for a user to check the accuracy of system configuration parameters that have been provided on a previously installed thermostat or other controller. If need be, replacement configuration parameters can be automatically loaded onto the thermostat or other controller. Such embodiments can serve to protect climate control system equipment from damage that might have resulted from incorrect configuration of a thermostat or other controller.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for remotely testing whether a climate control system controller is correctly installed, the apparatus comprising:

a mobile device wirelessly connected with a climate control system controller installed in a climate control system for a structure, the climate control system controller including a thermostat, the mobile device having a processor and memory configured to:

wirelessly activate the climate control system controller to perform, in one or more predefined sequences, one or more predefined climate control functions to change climate in the structure, wherein the processor is configured to, in connection with wirelessly activating the climate control system, send heating and/or cooling signals to the climate control system controller, each heating and/or cooling signal specific to a potential wiring connection of the climate control system controller;

receive wirelessly one or more signals indicative of temperature change in the structure in response to the sent heating and/or cooling signals, and indicating whether, and if so, how, climate in the structure is changed after wirelessly activating the climate control system controller; and based on the one or more received signals, determine, at the mobile device, whether the climate control system controller as configured at installation is accurately configured with system configuration parameters relative to the climate control system, the system configuration parameters specifying a type of equipment controlled by the climate control system controller, wherein the at least one processor is configured to, in connection with determining, at the mobile device, whether the climate control system controller as configured at the installation is accurately configured:
- based on the one or more received signals, determine an actual system configuration of the climate control system, wherein the processor is configured to, in connection with determining the actual system configuration of the climate control system, determine whether the received one or more signals are indicative of an expected response of the equipment controlled by the climate control system controller to the sent heating and/or cooling signals;
- compare the determined system actual system configuration of the climate control system with a user-specified system configuration obtained from the climate control system controller as configured at the installation of the climate control system controller; and
- when the determined actual system configuration of the climate control system does not match with the user-specified system configuration of the climate control system, determine that the climate control system controller is not accurately configured with the system configuration parameters relative to the climate control system.

2. The apparatus of claim 1, wherein the mobile device is configured to, in response to the determination that the climate control system controller is not accurately configured with the system configuration parameters relative to the climate control system, do one or more of the following:
- send revised system configuration parameters to the climate control system controller,
- automatically configure the climate control system controller with revised system configuration parameters,
- notify a user to change system configuration parameters configured on the climate control system controller, and
- notify a user that the climate control system controller was automatically configured with revised system configuration parameters.

3. The apparatus of claim 1, wherein the mobile device is configured to, in response to the determination that the climate control system controller is not accurately configured with the system configuration parameters relative to the climate control system, do one or more of the following:
- send revised system configuration parameters to the climate control system controller,
- notify a user to change system configuration parameters configured on the climate control system controller, and
- notify a user that the climate control system controller was automatically configured with revised system configuration parameters.

4. The apparatus of claim 1, wherein the mobile device is wirelessly connected with the climate control system controller via a direct short-range wireless connection and the climate control system controller comprises a thermostat.

5. The apparatus of claim 1, wherein the mobile device is configured to determine, based on the one or more received signals, an outdoor equipment configuration of the climate control system and an indoor equipment configuration of the climate control system.

6. The apparatus of claim 1, wherein the one or more predefined sequences are configured so as to provide for determining one or more of the following: an outdoor equipment configuration of the climate control system, and an indoor equipment configuration of the climate control system.

7. The apparatus of claim 1, wherein the one or more predefined sequences are configured so as to provide for determining the presence or absence in the climate control system of one or more climate control system components.

8. The apparatus of claim 1, wherein the mobile device is wirelessly connected with one or more cloud-based devices to transmit an information request or to receive a periodic software update.

9. A climate control system controller for installation in a climate control system for a structure, the controller being operable to:
- when installed in a climate control system, receive one or more instructions from a mobile device activating the controller to call for operation of one or more components of the climate control system in one or more predefined sequences to change climate in the structure, the one or more instructions comprising heating and/or cooling signals, each heating and/or cooling signal specific to a potential wire connection of the climate control system controller;
- upon receiving the one or more instructions, control the climate control system in accordance with one or more user-specified system configuration parameters stored in the controller, the user-specified system configuration parameters specifying a type of equipment controlled by the climate control system controller;
- send to the mobile device one or more signals descriptive of the climate in the structure and indicative of temperature change in the structure in response to the received heating and/or cooling signals; and
- after sending the one or more signals descriptive of the climate and indicative of temperature change in the structure, wirelessly receive, from the mobile device, one or more revised system configuration parameters for automatic reconfiguration of the climate control system controller, as configured at installation of the climate controller system controller, wherein the one or more revised system configuration parameters are based on the sent one or more signals.

10. The controller of claim 9, operable to wirelessly send signals descriptive of ambient temperature to the mobile device.

11. The controller of claim 10, wherein the revised system configuration parameters are based on the ambient temperature signals sent to the mobile device.

12. The controller of claim 9, comprising a thermostat.

13. A computer-performed method for remotely testing whether a climate control system controller is correctly installed, the method comprising:
- wirelessly connecting, by a mobile device, with a remote climate control system controller installed in a climate control system for a structure;
- wirelessly sending, from the mobile device, one or more heating and/or cooling signals to activate the remote climate control system controller to perform one or more predefined climate control functions to change climate in the structure in one or more predefined sequences, each heating and/or cooling signal specific to a potential wiring connection of the climate control system controller;
- wirelessly receiving, at the mobile device, one or more signals from the climate control system controller indicative of temperature change in the structure in response to the sent one or more heating and/or cooling signals and indicating whether the climate control system controller is activating and/or deactivating one or more components of the climate control system in accordance with the one or more sent heating and/or cooling signals; and
based on the one or more signals received from the climate control system controller, determining, by the mobile device remote from the climate control system controller whether the climate control system controller as configured at installation is configured with accurate system configuration parameters for the climate control system, the system configuration parameters specifying a type of equipment controlled by the climate control system controller, wherein the determining comprises:
determining an actual system configuration of the climate control system based on the one or more signals indicative of the temperature change received from the climate control system, wherein determining the actual system configuration of the climate control system includes determining whether the received one or more signals are indicative of an expected response of the equipment controlled by the climate control system controller to the sent one or more heating and/or cooling signals;
obtaining a user-specified system configuration of the climate control system from the climate control system controller as configured at the installation of the climate control system controller;
comparing the determined actual system configuration of the climate control system with the obtained user-specified system configuration of the climate control system; and
when the determined actual system configuration of the climate control system does not match with the obtained user-specified system configuration of the climate control system, determining that the climate control system controller is not accurately configured with the system configuration parameters.

14. The method of claim 13, further comprising, in response to the determination that the climate control system controller is not accurately configured with the system configuration parameters, sending one or more revised system configuration parameters to the climate control system controller.

15. The method of claim 13, performed in response to user input of system configuration parameters to the climate control system controller.

16. The method of claim 13, wherein the climate control system controller is a thermostat.

17. The method of claim 13, further comprising one or more of the following:
determining a system type of the climate control system and sending a notification that the climate control system controller has been reconfigured with system configuration parameters revised in accordance with the climate control system type;
sending a notification that the climate control system controller needs to be reconfigured with revised system configuration parameters for the climate control system;
sending a notification that one or more user-input system configuration parameters are incorrect; and
sending a notification that one or more user-input system configuration parameters are correct.

18. The method of claim 13, wherein determining whether the climate control system controller is configured with accurate system configuration parameters is based on ambient temperature change, if any, in the structure.

19. The method of claim 13, wherein wirelessly sending comprises sending directly from the mobile device to the climate control system controller via a short-range wireless communication protocol.

20. The method of claim 13, further comprising determining whether the climate control system controller is configured to call for operation of a specific stage of heating or cooling.

21. The apparatus of claim 1, wherein the mobile device is wirelessly connected with the climate control system controller via a direct short-range wireless connection or the climate control system controller comprises a thermostat.

22. The apparatus of claim 1, wherein the mobile device is configured to determine, based on the one or more received signals, an outdoor equipment configuration of the climate control system or an indoor equipment configuration of the climate control system.

* * * * *